United States Patent
Tsirkin

(10) Patent No.: US 11,455,024 B2
(45) Date of Patent: Sep. 27, 2022

(54) IDLE STATE ESTIMATION BY SCHEDULER

(71) Applicant: Red Hat, Inc., Raleigh, NC (US)

(72) Inventor: Michael S. Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 617 days.

(21) Appl. No.: 16/380,816

(22) Filed: Apr. 10, 2019

(65) Prior Publication Data

US 2020/0326766 A1   Oct. 15, 2020

(51) Int. Cl.
*G06F 1/32* (2019.01)
*G06F 1/329* (2019.01)
*G06F 1/3228* (2019.01)

(52) U.S. Cl.
CPC ............ *G06F 1/329* (2013.01); *G06F 1/3228* (2013.01)

(58) Field of Classification Search
None
See application file for complete search history.

(56) References Cited

U.S. PATENT DOCUMENTS

| | | | |
|---|---|---|---|
| 9,026,829 B2 | 5/2015 | Weissmann et al. | |
| 9,507,410 B2* | 11/2016 | Eckert | G06F 1/3296 |
| 2006/0037024 A1* | 2/2006 | Bodas | G06F 11/3423 |
| | | | 718/105 |
| 2013/0097415 A1* | 4/2013 | Li | G06F 1/3296 |
| | | | 713/100 |
| 2013/0097443 A1* | 4/2013 | Li | G06F 1/3206 |
| | | | 713/322 |
| 2014/0068165 A1* | 3/2014 | DeCorte | G06F 9/544 |
| | | | 711/104 |
| 2014/0068636 A1* | 3/2014 | Dupont | G06F 9/545 |
| | | | 719/318 |
| 2014/0149772 A1* | 5/2014 | Arora | G06F 1/3234 |
| | | | 713/323 |
| 2014/0181553 A1* | 6/2014 | Eckert | G06F 1/329 |
| | | | 713/323 |
| 2014/0181556 A1* | 6/2014 | Eckert | G06F 1/3296 |
| | | | 713/323 |
| 2015/0067357 A1* | 3/2015 | Arora | G06F 1/3234 |
| | | | 713/300 |
| 2015/0185801 A1* | 7/2015 | Arora | G06F 1/3287 |
| | | | 713/320 |
| 2015/0193249 A1 | 7/2015 | van Riel et al. | |
| 2015/0198991 A1* | 7/2015 | Bircher | G06F 1/3287 |
| | | | 713/323 |

(Continued)

OTHER PUBLICATIONS

Wysocki, Rafael J., "CPU Idle Loop Rework", [Retrieved from https://kernel-recipes.org/en/2018/talks/cpu-idle-loop-rework/], Sep. 26, 2018, 1 page.

(Continued)

*Primary Examiner* — Phil K Nguyen
(74) *Attorney, Agent, or Firm* — Lowenstein Sandler LLP

(57) ABSTRACT

Systems and methods for improving idle time estimation by a process scheduler are disclosed. An example method comprises calculating, by a process scheduler operating in a kernel space of a computing system, an estimated idle time for a processing core, responsive to detecting a transition of the processing core from an idle state to an active state, recording, an actual idle time of the processing core, and making the estimated idle time and the actual idle time available to a user space process.

14 Claims, 5 Drawing Sheets

(56) References Cited

U.S. PATENT DOCUMENTS

| | | | |
|---|---|---|---|
| 2015/0212569 A1* | 7/2015 | Goyal | G06F 1/3206 |
| | | | 713/320 |
| 2015/0242229 A1 | 8/2015 | van Riel et al. | |
| 2015/0286271 A1 | 10/2015 | Vrind et al. | |
| 2017/0038824 A1 | 2/2017 | An et al. | |
| 2019/0034229 A1* | 1/2019 | Guo | G06F 11/3024 |

OTHER PUBLICATIONS

Roba, Andrei, et al., "An Enhanced Approach to Dynamic Power Management for the Linux Cpuidle Subsystem", 2015 IEEE International Conference on Intelligent Computer Communication and Processing (ICCP), Sep. 3-5, 2015, pp. 511-517.

Diao, Qian, et al., "Prediction of CPU Idle-Busy Activity Pattern", [Retrieved from http://citeseerx.ist.psu.edu/viewdoc/download?doi=10.1.1.332.1855&rep=rep1&type=pdf], 2008, pp. 27-36.

* cited by examiner

IDLE STATE ESTIMATION BY SCHEDULER

TECHNICAL FIELD

The present disclosure is generally related to computer systems, and more particularly, to idle time estimation and idle state selection.

BACKGROUND

A computer processor is described as idle when it is not executing a task, such as when all tasks have been executed and it is waiting for the next task. When idle, parts of the processor can be shut off to reduce power consumption. The processor remains idle until a signal is received, such as an interrupt, indicating that the parts of the processor that were shut off should be turned back on to execute a task.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
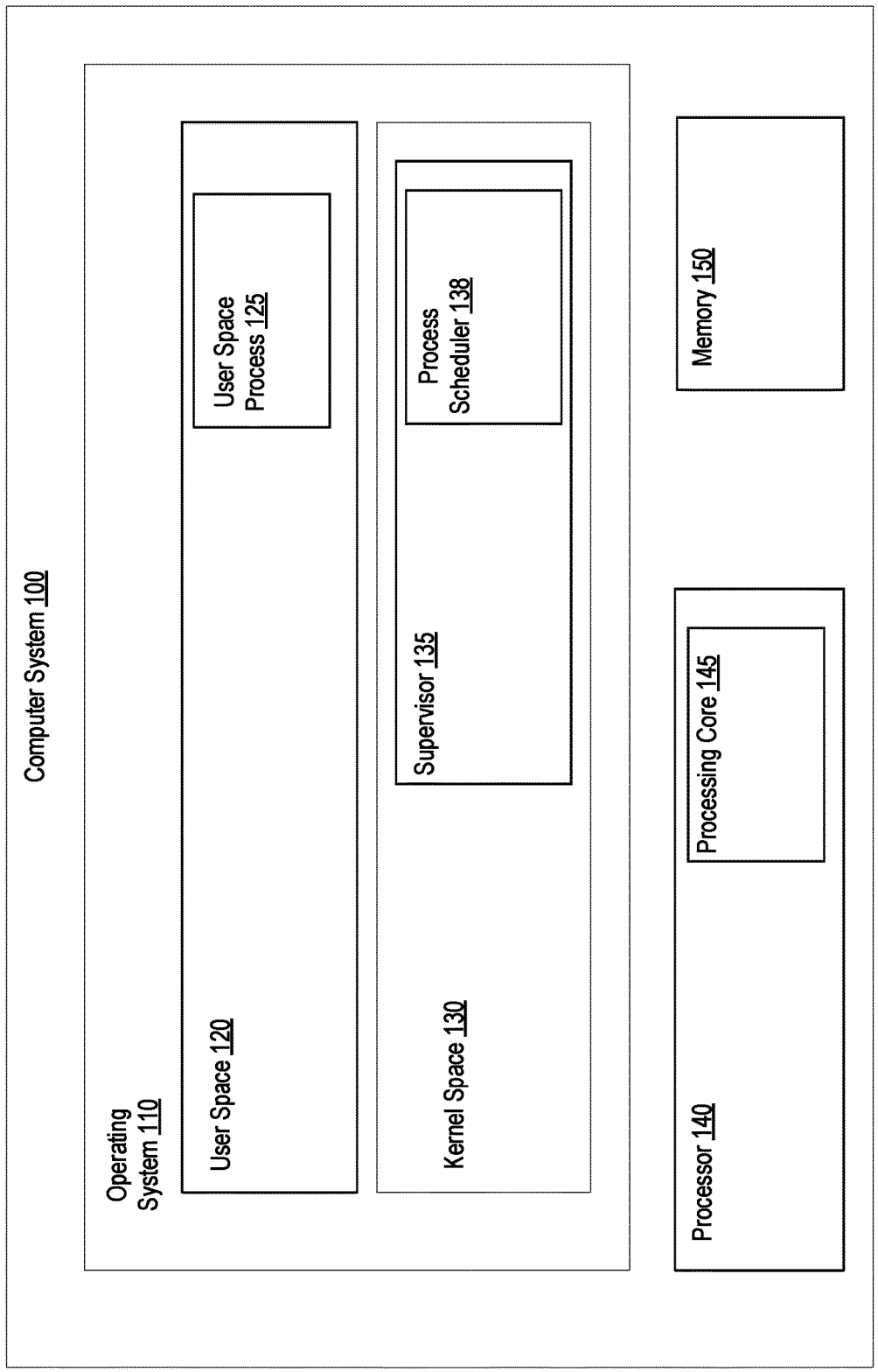
FIG. 1 depicts a high-level component diagram of an example computer system architecture, in accordance with one or more aspects of the present disclosure.

Described herein are systems and methods for improving idle state estimation by the process scheduler. In a computer system, a central processing unit (CPU), or a processing core, may not have any tasks to execute such as when it has completed all scheduled tasks. When a CPU does not have any tasks to execute it may transition to an idle state, in which at least part of the CPU is shut off. The CPU may transition to one of multiple idle states. Each idle state may shut off a different portion and/or components of the CPU. Generally, the larger the portion of the CPU that is shut off the longer it takes for the CPU to return to an active state. A component of an operating system, such as a process scheduler, executing on the computer system may estimate a time that the CPU will be in an idle state and, using the estimation, select which idle state for the CPU to enter. The estimation of the time for which the CPU may be idle is based on prior recorded times that the CPU was idle, a length of time until the next timer goes off, latency constraints of the CPU, and prior interrupt timings. However, the estimation may be inaccurate since calculation of the estimated idle time is based at least in part on prior performance and fails to account for all factors affecting future events.

Aspects of the present disclosure address the above noted and other deficiencies by improving idle time estimation by the scheduler through providing a user space process access to recorded idle times and estimated idle times. The user space process may provide for better estimations because the user space may have access to more information about application workload and workload requirements. By providing the user space process with additional information about prior idle times, the user space process may generate more accurate idle time estimations. In particular, the scheduler may record an estimated idle time, measure and record the corresponding actual time spent idle and communicate the estimated idle times and actual idle times to the user space process. The user space process may then calculate an adjustment to be applied to subsequent idle time estimations to more accurately estimate CPU idle times.

In an illustrative example, the scheduler may calculate an estimated time that the CPU will spend idle using prior recorded information. For example, the scheduler may use previously recorded idle times, a length of time until the next timer goes off, latency constraints of the CPU, and/or prior interrupt timings to calculate the estimate. The calculation may include generating an average of previously recorded idle times weighted according to how recently they were recorded. For example, the most recent idle times may be weighted higher than earlier recorded idle times when calculating the average idle time (i.e. a time degrading average). The estimated idle time may be used to select an idle state for the CPU (i.e. a state in which part of the CPU is turned off). The idle state may be selected to maximize power savings while ensuring that the processing core would wake up before the estimated idle time lapses. Each idle state may shut off a different portion of the CPU. For example, a high power idle state may only shut down certain clock cycles and thus can be returned to active relatively quickly. On the other hand, a very low power idle state may shut down most of the CPU and have a long latency in returning to an active state. Therefore, the accuracy of the idle time estimation is very important. To save power without impacting performance the lowest power idle state may be selected for the length of the idle time that allows the CPU to return to an active state within the estimated time period.

The scheduler may record the actual idle time after detecting that the processing core has become active again. The scheduler may detect that the processing core is active again when the processing core receives an interrupt (e.g., an I/O interrupt, a timer interrupt, an Interprocessor Interrupt (IPI) signaling that a new task has been assigned to the processing core, etc.). The actual idle time may be different than the estimated idle time in which case an adjustment may need to be made to optimize subsequent estimations and the selection of subsequent idle states. The scheduler may make the estimated idle time and the actual time spent in the idle state available to a user space process. The scheduler may store the estimated idle time and the actual idle time in a data structure accessible by the user space process, such as through a system call. Alternatively, a performance counter monitor, or the like, may make the estimated and actual idle times available to the user space. The user space process may then use any number of techniques, such as an average difference or a machine learning algorithm, to determine an adjustment to be made to the scheduler estimations. The scheduler may, for example, add the adjustment to the calculated estimation as a constant if the idle time is consistently over or underestimated by approximately the constant value.

Aspects of the present disclosure may provide for more accurate idle time estimations and therefore optimize selection of idle states. More particularly, aspects of the present disclosure can reduce power consumption of a processor by selecting a sleep state that can provide the most reduced power state while preventing increased latency due to over estimation of idle time.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 comprises an operating system 110, a processor 140, and memory 150. Operating system 110 comprises a user space process 125 running within a user space 120 and a supervisor 135 running within a kernel space 130. Supervisor may include a process scheduler 138. Processor 140 may include one or more processor cores 145.

Operating system 110 may be software that controls hardware resources and basic functions of the computer system such as scheduling, memory management, executing applications, and so on. In one example, operating system 110 comprises a user space 120 and a kernel space 130. The kernel space 130 may execute processes fundamental to the operating system such system calls, memory management, process scheduling, device drivers and so on. The kernel space 130 may have access privileges to areas of memory 150 that the user space 120 does not have privilege to access. User space 120 may be all programs that run outside the kernel space 130. User space 120 may execute user applications, programs, and libraries that an operating system 110 uses to interact with the kernel space 130.

A supervisor 135 may run within the kernel space 130 and a process scheduler 138 may run within the supervisor 135. Supervisor 135 may be software that oversees a number of functions of the kernel space, including the process scheduler 138. The process scheduler 138 may assign resources to complete tasks of the computer system 100. The process scheduler 138 may handle threads, processes, and data flows by assigning, or scheduling, them to processors, network links, or other resources to handle the tasks. In one example, process scheduler 138 may estimate a time for which a processing core 145 is to spend idle (i.e. no tasks to execute). The scheduler 138 may further select an idle state for the processing core 145 to enter while it is idle. The scheduler 138 may select the idle state to reduce power consumption during the idle period. To most effectively save power while preventing latency effects, the scheduler 138 may select an idle state for the processing core 145 that provides the most power savings but still "wakes up," i.e. transitions to an active state, within the estimated idle time.

In the same or different example, process scheduler 138 may record, for each processing core 145, both the estimated idle time and the actual idle time. The estimated idle times and actual idle times may be time stamped upon being recorded by the process scheduler 138. Alternatively, the process scheduler 138 may record the differences, or the running average of the differences, between the estimated and actual idle times if memory is insufficient to record both estimated and actual idle times. The scheduler 138 and/or the supervisor 135 may communicate the estimated idle times and actual idle times, or the differences in the estimated and actual idle times to the user space process 125.

The process scheduler 138 may store the estimated and actual idle times in a data structure such as a ring buffer to which the user space process has access. The estimated idle times and actual idle times may be communicated to the user space process 125 though a system call. The user space process 125 may request access to the estimated and actual idle times through a system call to the kernel space 130. The kernel space 130 may then retrieve the estimated and actual idle times and provide them to the user space process. In one example, the kernel space 130 may write the estimated and actual idle times to one or more performance counters of the processing core 145. A performance counter monitor, or other software, may collect the estimated and actual idle times from the performance counters, along with other performance information, and communicate the information to the user space process 125. All information recorded in the performance counters may be timestamped upon being recorded.

The user space process 125 executing within the user space 120 may be an estimation adjustment daemon for receiving the estimated and actual idle times recorded by the process scheduler 138. The estimation adjustment daemon may calculate an adjustment to idle time estimations to then be applied by the process scheduler 138 for calculating subsequent idle time values. The user space process 125 may use the estimated and actual idle times as inputs to calculate how much the idle time estimations of the process scheduler 138 differ from the actual time that the processing core 145 spends idle. For example, the user space process 125 may calculate an average difference between the estimated idle times and the actual idle times. The average may be calculated over a temporal range or over a given number of previously recorded pairs of estimated and actual idle times. The user space process 125 may send the result of the calculation to the process scheduler 138 for the process scheduler 138 to apply the result in a subsequent idle time estimation calculation. In one example, the sign of the calculated average difference may be switched and then added as a constant to an idle time estimated by the process scheduler 138 before the process scheduler 138 selects an idle state for the processing core 145. In another example, the user space process 125 may use the estimated and actual idle times as inputs to a machine learning algorithm to generate the adjustment to subsequent estimated idle times.

Processor 140 may be a system-on-a-chip (SOC) comprising one or more processing cores 145, data caches, memory management units, etc. Processing core 145 may comprise an arithmetic logic unit, registers, and memory controllers. Processing core 145 may execute tasks assigned to it by the process scheduler 138. When the processing core 145 has completed all tasks assigned to it and is waiting for its next task it may enter an idle state. The process scheduler 138 may estimate how long the processing core will be idle before an interrupt occurs (e.g., an I/O interrupt, a timer interrupt, an Interprocessor Interrupt (IPI) signaling that a new task has been assigned to the processing core, etc.). Upon receiving the interrupt, the processing core may transition into the active state, and the process scheduler 138 may record the time period over which the processing core was in an idle state. In an idle state, at least part of the processing core is shut off to reduce power consumption. The processing core 145 may be put into one of many different idle states. In one example, the processing core 145 may comply with the Advanced Configuration and Power Interface (ACPI) standard for device configuration and power management. The processing core 145 may be able to occupy one of four ACPI processor states: C0, C1, C2, or C3. State C0 may be a normal powered-on operating state of the processing core 145. States C1, C2, and C3 may each represent a different idle state. Each of the idle states may shut off a different portion of the processing core 145. State C1 may be a "halt," in which the processing core 145 is not executing instructions but can quickly (essentially instantaneously) return to state C0. State C2 may be a "stop-clock," in which the clocks of the processing core 145 are stopped but the state of software remains the same (i.e. is still visible to the processing core). It may take longer for the processing core 145 to return from state C2 to C0 than from C1 to C0. State C3 may be a "sleep," in which the internal and external processor clocks of the processing core 145 are stopped. It may take longer for the processing core 145 to return from C3 to C0 than from C1 or C2. The processing core 145 may also be able to enter any number of additional or alternative power states.

Memory 150 may include volatile memory devices (e.g., random access memory (RAM)), non-volatile memory devices (e.g., flash memory), and/or other types of memory devices. Memory 150 may comprise storage corresponding to the kernel space 130 and storage corresponding to the user space 120. Generally, storage for the kernel space 130 may only be accessed by user space 120 processes through system calls, protecting the kernel space 130 from malicious software.

Figure 2:
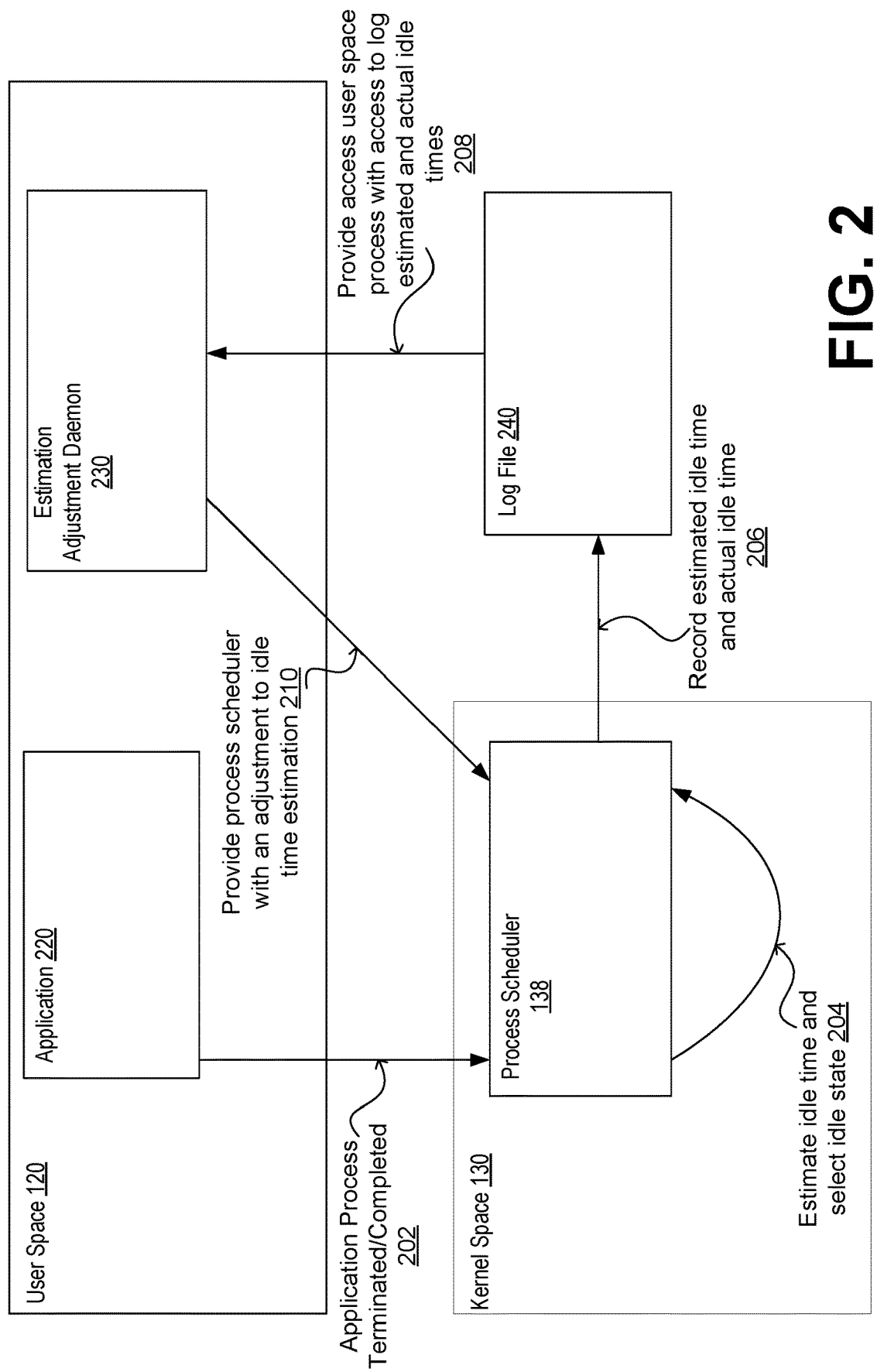
FIG. 2 depicts a block diagram of a process flow for improving CPU idle time estimation by a scheduler, in accordance with one or more aspects of the present disclosure.

FIG. 2 depicts a block diagram of an example process flow for improving idle state estimation by a scheduler. User space 120, kernel space 130, and process scheduler 138 may be the same or similar to user space 120, kernel space 130, and process scheduler, as described with respect in FIG. 1. User space 120 may comprise an application 220 and an estimation adjustment daemon 230. The estimation adjustment daemon 230 may be the same or similar to user space process 125, as described with respect to FIG. 1. Kernel space 130 may comprise process scheduler 138 which may access a log file 240 for storing estimated and actual idle times for a processing core.

At step 202, an application may have been executing on a processing core but the application may have been terminated or the processing core may have finished executing the application. The termination or completion of the application process may indicate that the processing core is going to become idle. Additionally, the application process may be waiting for an I/O event, and thus may become idle. At step 204, after determining that the processing core is going to be idle, the scheduler may calculate an estimate of the time during which the processing core will be idle. The scheduler may calculate the estimate using prior recorded idle times, a length of time until the next timer goes off, latency constraints, prior interrupt timings, etc. In one example, calculating the estimate may include a time degrading average of previously recorded idle times, meaning that the most recent recorded idle times will be weighted more heavily in the calculation. Then, once an estimated idle time has been calculated, an idle state may be selected for the processing core to enter while idle. The idle state may be selected to maximize power savings while allowing the processing core to wake up before the estimated idle time lapses.

At step 206, after the processing core becomes active again, for example by an interrupt, the estimated idle time and the actual time spent in idle may be recorded in a log file 240. In one example, if there is not enough memory to record each estimated and actual idle time, the process scheduler may calculate and store the differences between respective estimated and actual idle times. In another example, the process scheduler may record a running average of the differences. In step 208, the operating system, e.g. operating system 110 in FIG. 1, may provide the estimation adjustment daemon 230 with access to the log file 240. In one example, the operating system may communicate the log file 240 to the estimation adjustment daemon 230 through a system call received from the estimation adjustment daemon 230. The estimation adjustment daemon 230 may request access to the log file 240 through the system call to the operating system. The kernel may then communicate the information from the log file 240 to the estimation adjustment daemon 230. In another example, the estimated and actual idle times may be recorded by the kernel space 130 in one or more performance counters of the processing core. A program such as a performance counter monitor executing on the operating system may then collect the information from the performance counter and store it in the log file 240. The performance counter monitor may then provide the estimation adjustment daemon 230 with access to the log file 240 through a system call or by directly storing the log file 240 in the user space 120. At step 210, after the estimation adjustment daemon calculates an idle time estimation adjustment using the estimated and actual idle times from log file 240, the estimation adjustment daemon 230 provides the process scheduler 138 with the adjustment. The idle time estimation adjustment may correct for consistently inaccurate past idle time estimation. For example, the process scheduler 138 may consistently overestimate the idle time of the processing core. The idle power daemon 230 may calculate an average difference between the estimated times and the actual times to come up with an offset to be applied to subsequent estimates provided by the process scheduler 138. The offset may then be added to the subsequent idle time estimates generated by the process scheduler 138 to more accurately predict the time in which the processing core is idle. The offset may be a multiplier, a constant added to the idle time estimate, or other adjustment that may be made to correct the estimation. In one example, the scheduler may combine, by a linear operation, the idle time estimation adjustment with an idle time value (i.e. estimated idle time) produced by the process scheduler. Combining the estimation adjustment to the estimated idle time value by a linear operation may comprise any combined operation of multiplication and addition by a constant applied to the idle time value.

Figure 3:
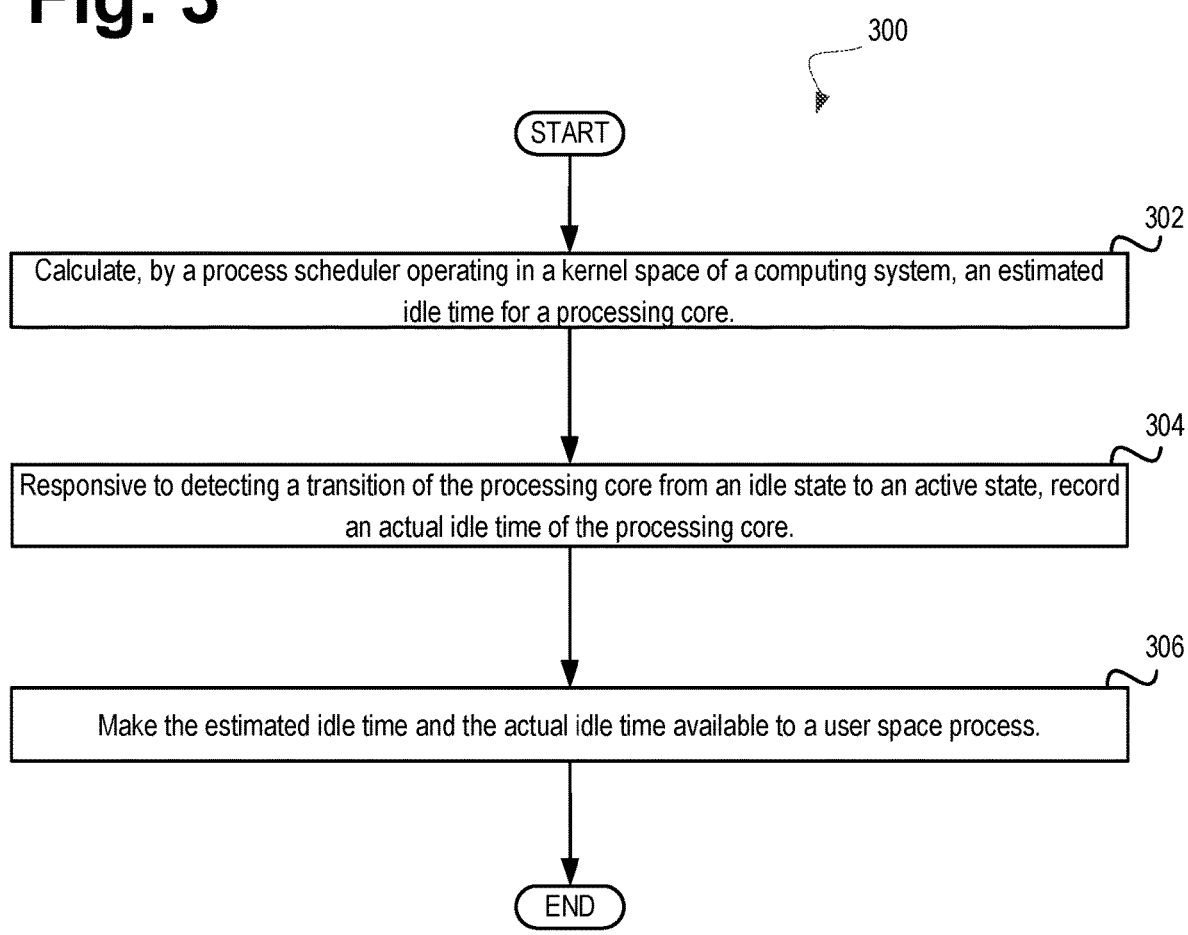
FIG. 3 depicts a flow diagram of an example method for improving CPU idle time estimation, in accordance with one or more aspects of the present disclosure.

FIG. 3 depicts a flow diagram of an example method 300 for improving idle time estimation by a process scheduler. Method 300 illustrates an example process flow for improving idle time estimation. Method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, method 300 may be carried out by process scheduler 138 of FIG. 1.

At block 302, a process scheduler operating in a kernel space of a computing system may calculate an estimated time for which a processing core is to be idle. The scheduler may use an idle time estimation function to estimate the idle time. The idle time estimation function of the scheduler may calculate the estimate using prior recorded idle times, a length of time until the next timer goes off, latency constraints, prior interrupt timings, etc. The process scheduler may determine that the processing core is about to become idle and that an idle state should be selected for the processing core to enter during the idle period. The processing core may become idle if an executing process is terminated or completed, the process is waiting for an I/O event, and so forth. The idle state may be selected using the idle time estimated by the process scheduler. For example, the idle state that provides the lowest power consumption while still allowing the processing core to wake up before the end of the estimated idle period may be selected. Such a selection of the idle state may allow for reduced power usage without impacting performance of the processing core.

At block 304, the process scheduler may record an actual idle time of the processing core in response to detecting that the processing core transitioned from idle to active. The process scheduler may be notified when the processing core receives an interrupt from a device or process, or other signal that the processing core has transitioned to an active state. The process scheduler may then record the duration of time that the processing core was idle. The actual idle time may differ from the idle time estimated by the process scheduler which could cause latency issues or prevent potential power savings.

At block 306, the process scheduler may communicate the estimated idle time and the actual idle time to a user space process. In one example, the estimated and actual idle times may be stored in memory accessible by the kernel space. Additionally, if the memory is insufficient to store each estimated and actual idle time, then the process scheduler may calculate and store a difference between respective estimated and actual idle times. The user space process may request access to the estimated and actual idle times through a system call to the kernel space 130. The kernel space may then retrieve the estimated and actual idle times and communicate them to the user space process. In another example, the kernel space 130 may store the estimated and actual idle times in one or more performance counters of the processing core. A performance counter monitor, or other software, may then collect and store the data from the performance counters in the log file 240 making it available for use by the user space process.

Figure 4:
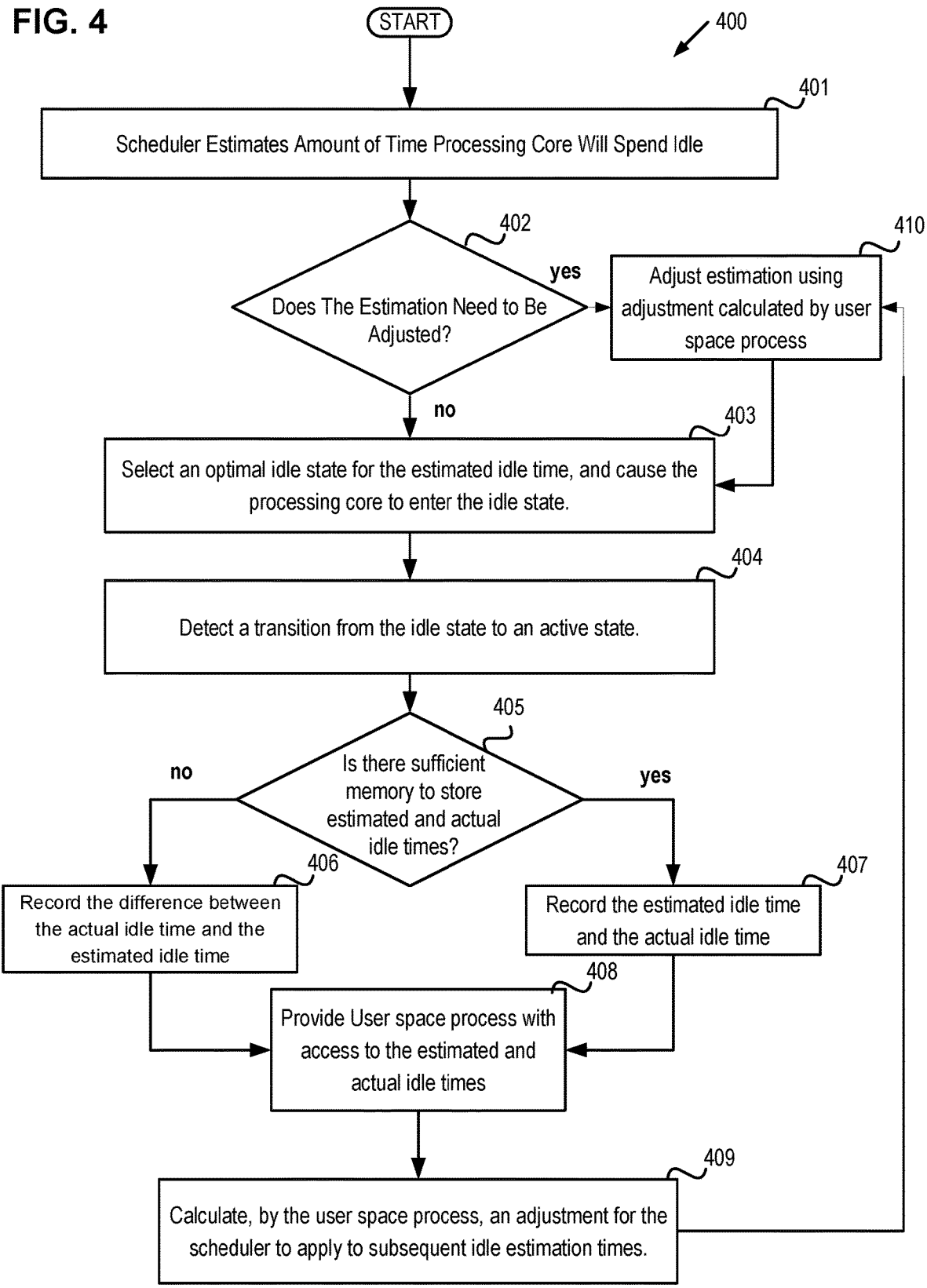
FIG. 4 depicts a flow diagram of an example method for improving CPU idle time estimation by a process scheduler using a user space process, in accordance with one or more aspects of the present disclosure.

FIG. 4 depicts a flow diagram of an example method 400 for improving idle time estimation by a process scheduler using a user space process. Method 400 illustrates an example process flow for improving idle time estimation. Method 400 may be performed by processing logic that may comprise hardware (e.g., processing device, circuitry, dedicated logic, programmable logic, microcode, etc.), software (e.g., instructions run or executed on a processing device), or a combination thereof. In some embodiments, method 400 may be carried out by process scheduler 138 and/or user space process 125 of FIG. 1.

At block 401, a process scheduler may estimate the amount of time a processing core will be idle. The estimation may be calculated using previously recorded actual idle times of the processing core, a length of time until the next timer goes off, latency constraints, prior interrupt timings, etc. At block 402, it may be determined whether the estimation needs to be adjusted. For example, the estimation may need to be adjusted if the scheduler is consistently over estimating the idle time. If it is determined at block 402 that the estimation needs to be adjusted then, the estimation may be adjusted at block 410 using an adjustment calculated by a user space process, as described later on with respect to block 409.

If at block 402 it is determined that the estimation does not need to be adjusted then the process scheduler may select an idle state that provides the optimal power reduction without reducing performance (e.g., slower wakeup time than estimated idle time). As described above with respect to FIG. 1, the processing core may comply with the Advanced Configuration and Power Interface (ACPI) standard for device configuration and power management. The processing core may be able to occupy one of four ACPI processor states: C0, C1, C2, or C3. State C0 may be a normal powered-on operating state of the processing core. States C1, C2, and C3 may each represent a different idle state. Each of the idle states may shut off a different portion of the processing core, as described above.

At block 404, the process scheduler may detect a transition of the processing core from the idle state to an active state. The transition may be indicated by an interrupt received by the processing core from a device or process that a new task should be addressed. The interrupt received may be an I/O interrupt, a timer interrupt, an Interprocessor Interrupt (WI) or other interrupt signaling that a new task has been assigned to the processing core, etc. At block 405, it may be determined whether there is sufficient memory to store the raw data comprising the estimated and actual idle times. If yes, then at block 407 the estimated idle time and the actual idle time are both stored. If no, then at block 406 the scheduler may calculate the difference between the actual idle time and the estimated idle time and then store the difference. In one example, the process scheduler may calculate and store a running average of the differences between respective estimated and actual idle times.

At block 408, the process scheduler may make the estimated and actual idle times, or their difference, accessible by a user space process. In one example, providing access may include receiving a system call from the user space process to access and retrieve the estimated and actual idle times stored in the log file. In another example, the kernel may write the estimated and actual idle times to one or more performance counters of the processing core or processor. Then, a kernel space process, such as a performance counter monitor, may communicate the estimated and actual idle times of the processing core to the user space process.

At block 409, the user space process may calculate an adjustment for the scheduler to apply to subsequent idle time estimations. The adjustment may be a correction to subsequent idle time estimations of the scheduler. For example, the process scheduler may consistently over or under estimate the idle time for the processing core. In such a case, the user space process may calculate an adjustment that, when applied to the process scheduler's idle time estimation, provides a more accurate idle time estimate. In one example, the user space process may calculate an average difference between the estimated idle times and the actual idle times. The user space process may change the sign of the average difference and then add the value as a constant to the idle time estimation before selecting an idle state for the processing core to enter. In another example, the user space process may receive the estimated idle times and the actual idle times as inputs to a machine learning algorithm that may more accurately calculate an adjustment to be applied to subsequent idle time estimations.

At block 410, if at block 402 the estimation of the process scheduler needs to be adjusted, then the adjustment calculated at block 409 may be applied to the estimation to correct for bias in the estimation. The adjustment may be applied as a constant added to the process scheduler's estimated idle time. Additionally, the adjustment may comprise a multiplicative factor, or any other mathematical operation, that is applied to the idle time estimated by the process scheduler. In one example, the scheduler may combine, by a linear operation, the idle time estimation adjustment with the estimated idle time value. Combining the estimation adjustment to the estimated idle time value by a linear operation may comprise any combined operation of multiplication and addition by one or more constants applied to the idle time value. Once the adjustment is applied, the estimated idle time may more closely reflect the actual idle time of the processing core, allowing an optimal idle state to be selected.

Figure 5:
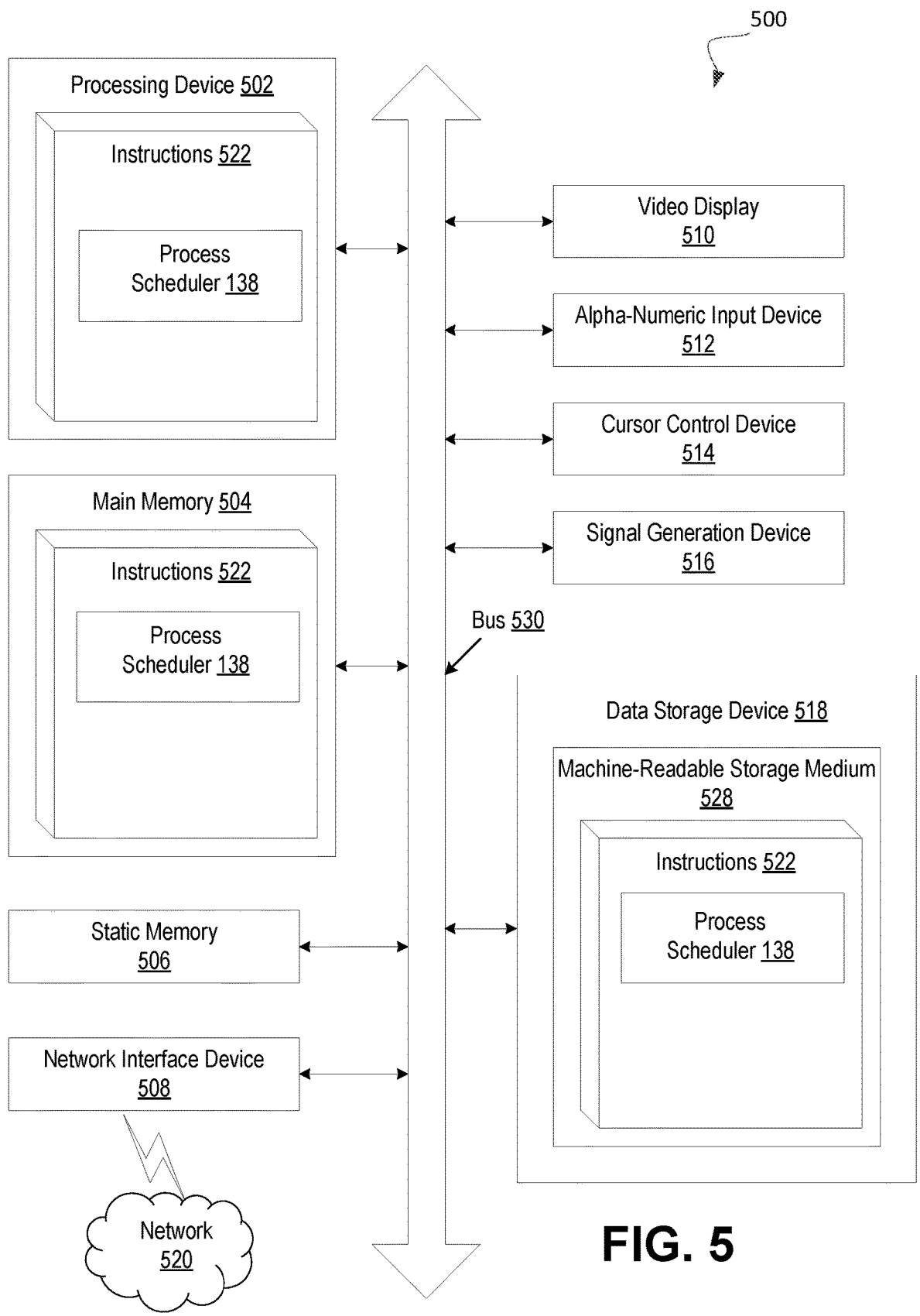
FIG. 5 depicts a block diagram of an illustrative computer system operating in accordance with examples of the invention.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530. The processing device 502 may be operatively coupled with the main memory 504, static memory 506, and/or the data storage device 518.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for process scheduler (e.g., process scheduler 138 of FIG. 1) and/or a software library containing methods that call a process scheduler. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "receiving," "executing," "returning," "loading," "associating," "granting," "sending," "writing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
    calculating, by a process scheduler operating in a kernel space of a computing system, an estimated idle time for a processing core based on a time degrading average of a plurality of previous actual idle times recorded;
    responsive to detecting a transition of the processing core from an idle state to an active state, recording an actual idle time of the processing core;
    communicating the estimated idle time and the actual idle time to a user space process;
    receiving, from the user space process, an idle time estimation adjustment; and
    calculating, in view of the idle time estimation adjustment, a second estimated idle time for the processing core by combining the idle estimation adjustment with an idle time value produced by the process scheduler.

2. The method of claim 1, wherein the estimated idle time reflects an average idle time measured over a defined period of time.

3. The method of claim 1, wherein the idle state is an ACPI idle state.

4. The method of claim 1, wherein communicating the estimated idle time and the actual idle time to the user space process is performed in response to receiving a system call requesting the estimated idle time and the actual idle time.

5. The method of claim 1, wherein communicating the estimated idle time and the actual idle time to the user space process comprises writing the estimated idle time and the actual idle time to a performance counter, wherein a performance counter monitor is to collect the estimated idle time and the actual idle time from the performance counter and store the estimated idle time and the actual idle time in memory accessible by the user space process.

6. A system comprising:
    a memory; and
    a processing device operatively coupled to the memory, the processing device to:
        calculate, by a process scheduler operating in a kernel space of a computing system, a first estimated idle time for a processing core based on a first time degrading average of a plurality of previous actual idle times recorded;
        responsive to detecting a first transition of the processing core from a first idle state to an active state, record, a first actual idle time of the processing core;
        calculate, by the process scheduler, a second estimated idle time for a processing core;
        responsive to detecting a second transition of the processing core from a second idle state to an active state, record, a second actual idle time of the processing core;
        communicate the first and second estimated idle times and the first and second actual idle times to a user space process;
        receive, from the user process, an idle time estimation adjustment; and
        calculate, in view of the idle time estimation adjustment, a third estimated idle time for the processing core by combining the idle time estimation adjustment with a value produced by an idle time estimating function.

7. The system of claim 6, wherein the idle time estimating function comprises a time degrading average of a plurality of previous actual idle times recorded over a defined period of time.

8. The system of claim 6, further comprising:
calculate a first difference between the first estimated idle time and the first actual idle time;
calculate a second difference between the second estimated idle time and the second actual idle time; and
record, by the process scheduler, the first and second differences of the estimated idle times and the actual idle times.

9. The system of claim 6, wherein making the first and second estimated idle times and the first and second actual idle times available to the user space process is in response to receiving a system call requesting access to the estimated idle times and the actual idle times.

10. The system of claim 6, wherein the idle state is an ACPI idle state.

11. A non-transitory machine-readable storage medium including instructions that, when accessed by a processing device, cause the processing device to:
calculate, by a process scheduler operating in a kernel space of a computing system, an estimated idle time for a processing core;
responsive to detecting a transition of the processing core from an idle state to an active state, record, an actual idle time of the processing core;
calculate a first average of the estimated idle time and a plurality of previously estimated idle times within a defined period of time;
calculate a second average of the actual idle time and a plurality of previously recorded actual idle times within the defined period of time;
communicate the estimated idle time, the actual idle time, the first average and the second average to a user space process;
receive, from the user space process, an idle time adjustment; and
calculate, in view of the idle time estimation adjustment, a third estimated idle time for the processing core by combining the idle time estimation adjustment with a value produced by an idle time estimating function.

12. The non-transitory machine-readable storage medium of claim 11, wherein the idle time estimating function comprises a time degrading average of a plurality of previous actual idle times recorded over a defined period of time.

13. The non-transitory machine-readable storage medium of claim 11, wherein making the estimated idle time, the actual idle time, the first average and the second average available to the user space process is in response to receiving a system call requesting access to the estimated idle time, the actual idle time, the first average and the second average.

14. The non-transitory machine-readable storage medium of claim 11, wherein the idle state is an ACPI idle state.

* * * * *